United States Patent [19]
Hinojosa et al.

[11] Patent Number: 4,512,359
[45] Date of Patent: Apr. 23, 1985

[54] VALVE MECHANISM WITH REPLACEABLE SEAL RINGS

[75] Inventors: Alberto L. Hinojosa; Kee Kim, both of Houston; Kenton Chickering, III, Simonton, all of Tex.

[73] Assignee: Daniel Industries, Inc., Houston, Tex.

[21] Appl. No.: 599,982

[22] Filed: Apr. 13, 1984

[51] Int. Cl.³ .......................... F16K 43/00; F16K 3/16
[52] U.S. Cl. ..................................... 137/315; 137/240; 251/172; 251/DIG. 1; 251/266; 277/142; 74/424.8 VA
[58] Field of Search ...................... 137/315, 318, 240; 138/94.3; 251/159, 172, 174, 175, 176, 327, 328, 266, 267, 270, DIG. 1; 74/424.8 VA; 277/12, 138, 142, 164, 165, 173

[56] References Cited
U.S. PATENT DOCUMENTS

| | | | |
|---|---|---|---|
| 1,938,460 | 12/1933 | Muff | 251/266 |
| 2,810,543 | 10/1957 | Bryant | 251/172 |
| 2,861,771 | 11/1958 | Bryant | 251/172 |
| 2,882,009 | 4/1959 | Bryant | 251/172 |
| 2,950,897 | 8/1960 | Bryant | 251/172 |
| 4,192,483 | 3/1980 | Combes | 251/172 |

Primary Examiner—George L. Walton
Attorney, Agent, or Firm—Gunn, Lee & Jackson

[57] ABSTRACT

A gate valve mechanism is provided which is especially designed for use as a hot tap valve. The valve incorporates a fabricated valve body having internal seat rings with circular elastomer sealing elements disposed within circular sealed grooves formed therein. A slab gate member is movable between the seat members between open and closed positions and is positionable radially outwardly of the seal grooves to permit replacement of the elastomer seal members. The valve body structure is of minimal thickness to permit access to the seal members through the flow ports of the valve in order to permit seal replacement. The valve also incorporates an internal rotatable threaded drive stem which receives a drive nut interconnected with the gate to thus permit opening and closing movement of the gate member by simply rotating the valve stem. The seat rings accomplish venting of the seal groove to the valve chamber and metal internal sealing lands to prevent seal extrusion and damage upon valve opening and closing movement.

6 Claims, 5 Drawing Figures

VALVE MECHANISM WITH REPLACEABLE SEAL RINGS

FIELD OF THE INVENTION

This invention relates generally to gate valve mechanisms and more specifically concerns gate valves that are intended for use in hot tap valve service. Even more specifically, the present invention concerns a gate valve mechanism which facilitates access to and replacement of resilient seal rings without requiring disassembly of the valve mechanism.

BACKGROUND OF THE INVENTION

A "hot tap" in the fluid handling industry is a procedure for establishing an opening in a pipeline while the pipeline is under pressure and in service and which permits such activities as branch line connection, repair bypass connections, etc. Hot tap connections are performed to permit uninterrupted service of the primary flowline during the line tapping procedure. Hot tap connection procedures eliminate the necessity of shutting down the main flowline, thereby eliminating loss of flowline production.

A hot tap connection procedure is conducted by first welding or otherwise attaching a pipe connection saddle to the flowline which incorporates a flange for bolted connection of a hot tap valve thereto. Aa pressure-containing dome with an internal cutter is then secured to the hot tap valve to thus provide a sealed enclosure including the valve chamber of the hot tap valve. Thereafter, pressure in the dome is balanced with line pressure and the valve is opened thus permitting the cutter to be extended through the valve and rotated against the flowline, thereby cutting an aperture in the flowline. In some cases pressure balancing occurs during the line cutting operation. In this case, as soon as the flowline is cut through, pressure from the flowline enters the hot tap valve and a dome and becomes equalized with respect to the flowline. After the hole cutting operation has been completed, the cutter is retracted from the valve and the valve is closed to thus isolate the pressure-containing dome from line pressure. Thereafter, pressure is bled from the dome to equalize the dome with atmospheric pressure. The dome and cutter mechanism then may be removed from the valve to thus permit connection of a branch line conduit, bypass conduit, etc., to the valve.

Especially in the case of hot tap type bypass repair operations, it is typical to remove the hot tap valve after the repaired line has been placed back in service. As is the case with most hot tap valves, the resilient elastomeric face sealing member incorporated within each of the valve seats becomes highly worn or deteriorated due to the pressure of metal cuttings resulting from the hole cutting procedure. In many if not most cases hot tap valves may be utilized only once before they must be disassembled in order to replace the sealing elements of the seat members or to replace the seat members themselves. Because of the large numbers of bolts that typically are utilized to secure a sandwich type hot tap valve in assembly, disassembly, repair and reassembly of hot tap valves is an extremely time consuming and expensive procedure. It is desirable therefore to provide a hot tap valve mechanism which is designed to provide service personnel with the capability of replacing the elastomeric resilient sealing members of the valve seats thereof without necessitating disassembly and reassembly of the valve mechanism.

SUMMARY OF THE INVENTION

It is therefore a primary feature of the present invention to provide a novel gate valve mechanism incorporating valve seat members with replaceable elastomeric sealing elements.

It is a further feature of the present invention to provide a novel gate valve mechanism wherein the gate member is positionable so as to permit replacement of the elastomeric sealing elements with replacement operations being conducted through the flow ports of the valve mechanism.

It is also a feature of this invention to provide a novel gate valve mechanism incorporating circular seat rings retained within seat recesses of the body and which incorporate O-ring type face sealing members that are restrained within seal grooves of the seat rings by pressure as the valve is opened or closed to thus prevent damage to the sealing members during such opening and closing movement.

It is an even further feature of this invention to provide a novel gate valve mechanism incorporating circular metal seat rings having seal grooves formed therein which have internal cam surfaces that retard extrusion or displacement of the seal members during opening and closing movement of the valve.

It is another feature of this invention to provide a novel gate valve mechanism incorporating circular metal seat rings having inner peripheral metal sealing lands which provide supplemental metal-to-metal seating in addition to providing an elastomeric seal radially outwardly of the sealing lands.

It is another feature of this invention to provide a novel gate valve mechanism incorporating a rotary internal valve stem which is rotated to induce opening and closing movement of the gate member contained within the valve chamber, thus minimizing space requirements which might otherwise be required, such as in the case of rising stem type gate valves.

Briefly, the principles of the present invention are realized through provision of a fabricated gate valve structure incorporating side plates and end plates which are in welded assembly. Upper and lower flanges are also welded to the side plates and end plates to permit closure of one end of the valve body and to provide for connection of a combination closure and valve actuating assembly at the opposite extremity of the valve body. The side plates of the valve body are formed to define threaded apertures about the flow passages of the valve body to thus provide for bolted connection of the valve body to appropriate flanges. Under circumstances where the valve mechanism is employed as a hot tap valve, one of the connection flanges will be the flange of a hot tap connector which is welded about the pipeline. The opposite flange in this case will be the connection flange of a hot tap cutter mechanism which is adapted to be extended through the flow passages of the valve and brought into rotating contact with the pipeline to thus cut an aperture in the pipeline within the hot trap connector. Although the present invention is discussed herein particularly as it relates to hot tap valves and hot tapping procedures for flowlines, it should be borne in mind that the invention is not intended to be restricted to hot tap procedures. The valve mechanism of this invention may find other uses within the spirit and scope of the invention. The invention therefore is not directed to the specific mechanisms for accomplishing a hot tapping procedure, but rather is restricted to a valve mechanism which is applicable to hot tapping procedures and which finds other efficient uses as well.

The valve body is formed internally to define opposed seat recesses within which are received circular metal seat rings which establish sealed engagement with the valve body by means of appropriate back face sealing members. The seat rings also define face seal grooves which are disposed about the central flow port of the seat rings and which are of generally triangular cross-sectional configuration so as to provide for efficient retention of O-ring elastomer sealing members within the respective seal grooves. The seat recesses define internal and external angulated cam surfaces which react with the O-ring type elastomeric sealing member to urge the sealing member more deeply into its seal groove. The seal groove also defines angulated bottom surfaces which also function to assist in seal retention. To further enhance seal retention a plurality of vent passages are formed in the seat rings which communicate the seal grooves with the valve chamber of the valve. During opening and closing movement pressure acting upon the O-ring sealing members functions to force the sealing members more deeply into their respective seal grooves and thus prevent any seal extrusion which might otherwise result in seal damage as the gate member is moved toward its closed position. The gate member of the valve is a non-ported gate having opposed flat sealing surfaces and having a lower edge which may be of arcuate form or planar configuration as desired. The lower edges of the gate member are rounded to thus further provide for camming retention of the seal members within their respective seal grooves and prevent damage to them as the gate member is closed. A threaded valve stem is rotatably mounted within the body of the valve and established a threaded driving connection with the gate member by virtue of an internally threaded projection extending from one end of the gate member.

In order to permit replacement of the elastomeric seal members without necessitating disassembly of the valve mechanism the gate member is positionable so as to permit access to the seal grooves through the flow ports of the body. Since hot tap valves are typically removed after completion of the hot tap procedure, valve repair personnel will simply position the gate member to expose the seal rings and by manual operations will remove worn elastomeric seal rings and replace them as desired. This feature compensates for the tendency of hot tap valves to become worn in a short period of time due to the presence of metal particles in the seat areas which are developed during cutting of the aperture in the pipeline. The sealing members may therefore be replaced in the field or at a service facility with a minimum of labor.

BRIEF DESCRIPTION OF THE DRAWINGS

So that the manner in which the above recited features, advantages and objects of the present invention will become apparent and can be understood in detail, more particular description of the invention, briefly summarized above, may be had by reference to the embodiment thereof which is illustrated in the appended drawings, which drawings form a part of this specification.

It is to be noted, however, that the appended drawings illustrate only a typical embodiment of the invention and are therefore not to be considered limiting of its scope for the invention may admit to other equally effective embodiments.

IN THE DRAWINGS

Figure 1:
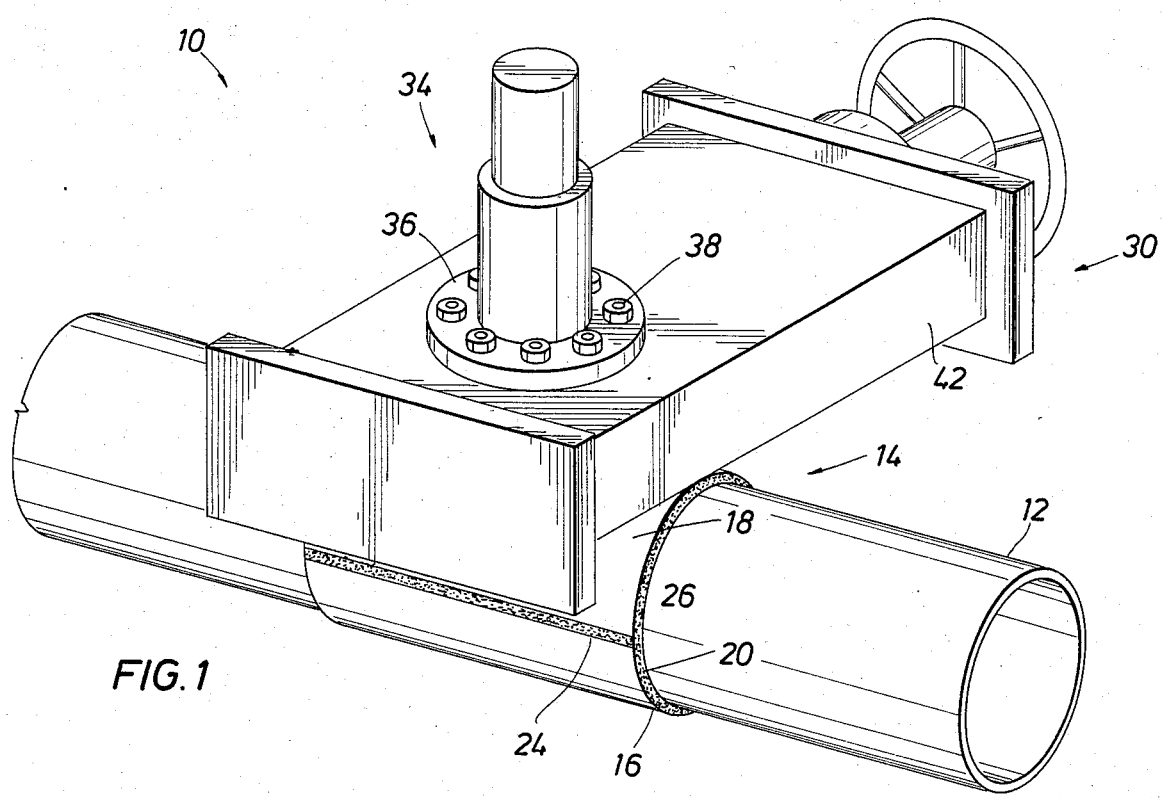

The present invention, both as to its organization and manner of operation, may best be understood by way of illustration and example of certain embodiments when taken in conjunction with the accompanying drawings in which:

FIG. 1 is an isometric view of a pipeline having a hot tap connection in assembly therewith and illustrating the gate valve of this invention in assembly with the hot tap connection and hot tap cutter mechanism.

Figure 2:
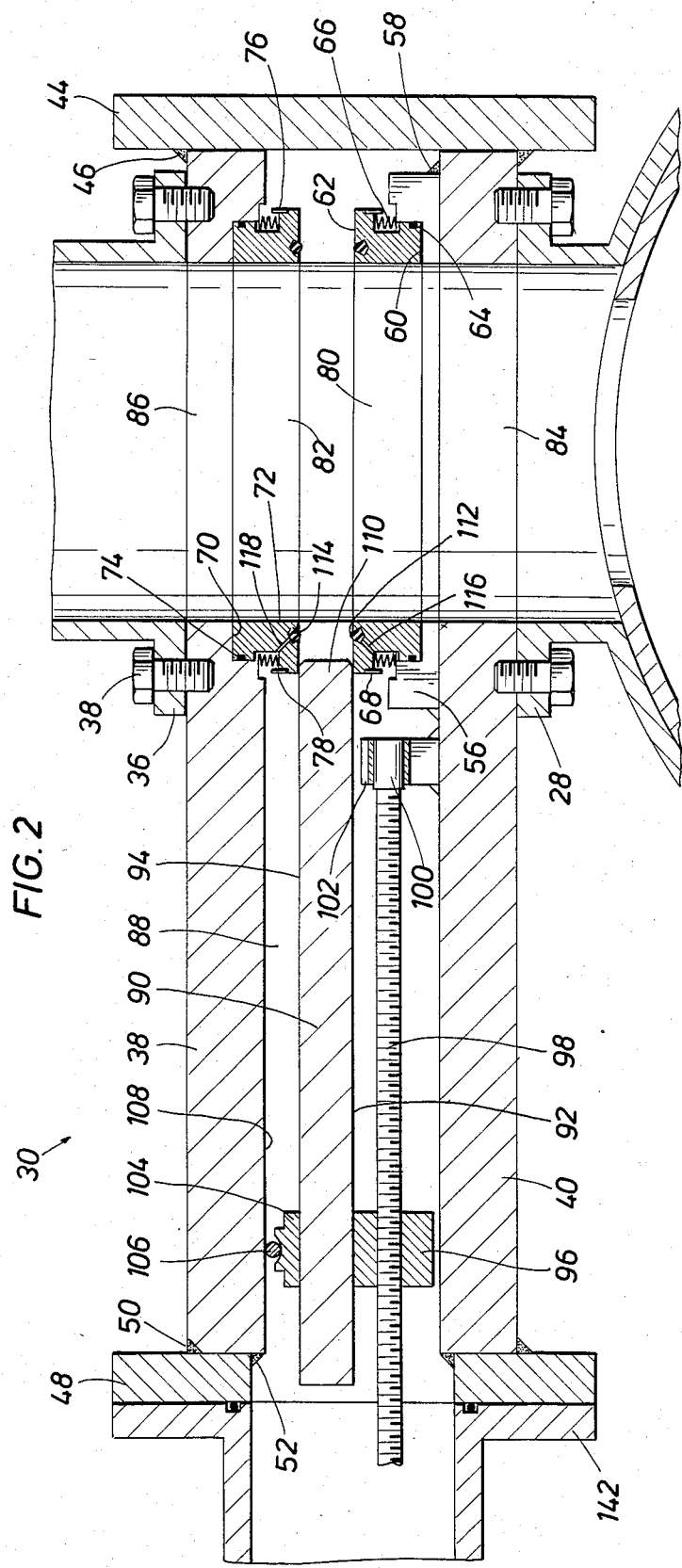

FIG. 2 is a sectional view of the gate valve of FIG. 1 illustrating the internal components thereof in detail.

Figure 3:
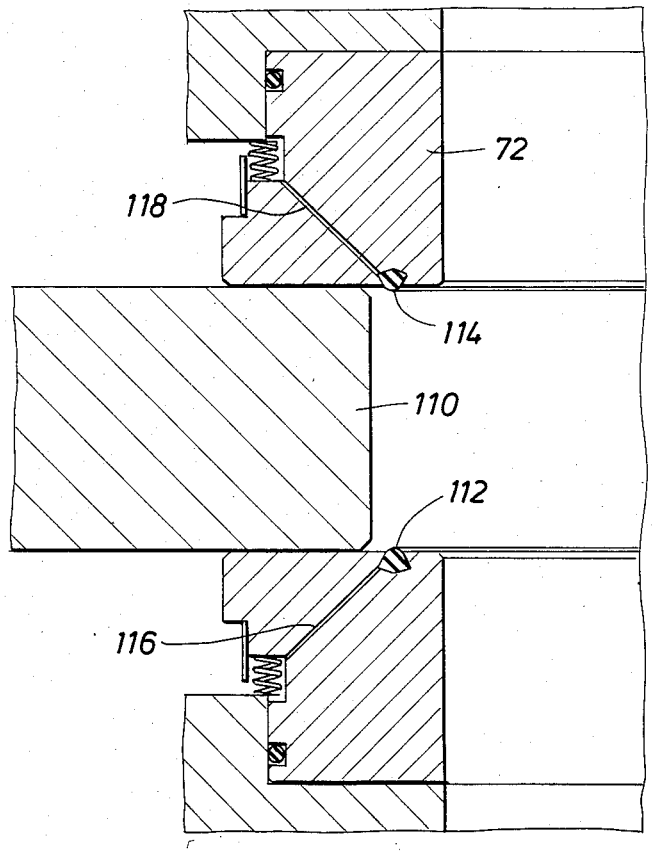

FIG. 3 is a fragmentary sectional view of the fabricated gate valve mechanism of FIG. 2, illustrating the seat assemblies thereof in detail.

Figure 4:
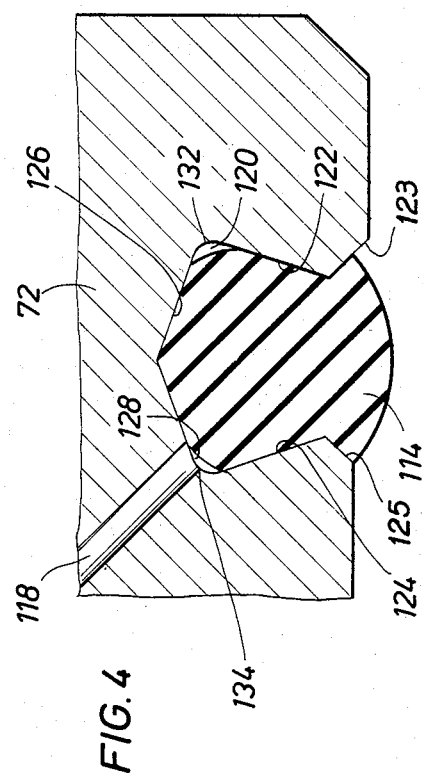

FIG. 4 is an enlarged fragmentary sectional view of one of the seat rings of FIGS. 2 and 3, illustrating the structure of the seat ring and seat ring groove in detail.

Figure 5:
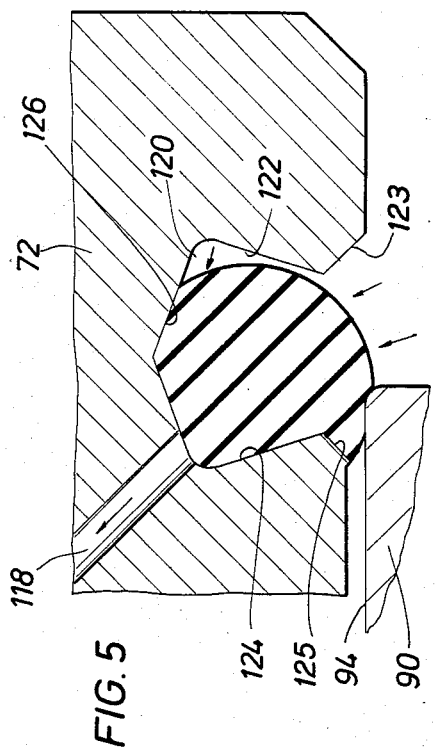

FIG. 5 is a fragmentary sectional view similar to that of FIG. 4 which illustrates pressure deformation of the resilient seal ring of the seat ring during opening or closing movement of the gate member to thus protect the seal member from being cut or otherwise damaged as the gate member is moved relative to the seat ring.

DETAILED DESCRIPTION OF PREFERRED EMBODIMENT

Referring now to the drawings and first to FIG. 1, a hot tapping assembly is illustrated generally at 10 wherein a pipeline 12 to which a branch line or bypass line is to be connected by means of hot tap operations. To prepare the pipeline 12 for hot tap operations a hot tap connection, illustrated generally at 14, is connected thereto. The hot tap connection incorporates generally semi-cylindrical sections 16 and 18 which are secured to the pipeline 12 by means of circular welds at 20 and 22 and are secured to one another by means of opposed linear welds 24.

The hot tap connection member 18 incorporates a transverse pipe section 26 having a circular connection flange 28 at the free extremity thereof as shown in FIG. 2. A gate valve member illustrated generally at 30 is secured to the flange 28 by means of a plurality of bolts or studs 32.

A hot tap cutter assembly illustrated at 34 is provided with a flange 36 at one extremity thereof which is secured on the opposite side of the valve mechanism by means of bolts or studs 38.

With the hot tap assembly secured to the pipeline in the manner illustrated in FIG. 1 the valve 30 will be actuated or manipulated to its open position after which the hot tap cutter mechanism 34 will be energized. A rotary cutter will then be moved through the flow passages of the valve and will be brought into contact with the pipeline 12. The cutter will be rotated so as to cut an opening in the pipeline by rotation of metal cutting teeth against the pipeline. Typically, the hot tap cutter assembly will be pressurized to the same pressure of the pipeline thereby eliminating pressure differential. This prevents the hot tap cutter mechanism and the valve mechanism from suddenly being subjected to the pressure of the pipeline when the pipeline is penetrated. Preliminary pressurization of the hot tap cutter assembly is preferable since such ensures the pressure integrity prior to penetration of the pressurized pipeline.

The valve mechanism 30 is of fabricated structure incorporating a pair of side plates 38 and 40 to which are connected a pair of end plates, one of which is shown at 42 in FIG. 1. At one extremity of the valve body, an end closure plate 44 is welded to the side plates and end plates by means of welds 46. At the opposite end of the valve body a connection flange 48 is welded to the side plates and end plates by means of welds 50 and 52. The connection flange 48 will typically be formed to define connection apertures 54 such as for bolted connection of a valve actuator assembly to the connection flange. The valve actuator assembly may conveniently take the form of a manually operated hand wheel assembly such as shown in FIG. 1 or, in the alternative, may take any suitable power energized form within the spirit and scope of the present invention. Since the valve mechanism is intended for operation under little if any pressure differential, it will typically be operated by means of a manual hand wheel but such is not in any way intended to limit the spirit and scope of the present invention.

Internally of the body plate 40 is mounted a seat carrier member 56 such as by welded connection 58. The seat retainer 56 defines a seat recess 60 within which is retained a circular metal seat member 62. The seat ring 62 is sealed with respect to the seat carrier 56 of the body by means of a circular O-ring sealing member 64 which is composed of any suitable elastomeric sealing material. The seat member 62 is energized by means of a plurality of compression springs 66 which are restrained in position between the seat ring and seat carrier by means of a spring retainer element 68.

At the opposite sides of the valve the side plate member 38 is formed internally to define a seat recess 70 within which is retained a circular metal seat ring 72 which may be identical to seat ring 62. The seat ring 72 is sealed with respect to the valve body by means of a circular sealing element 74 such as an O-ring or the like. The seat ring 72 is also energized by means of compression springs 76 which are restrained by means of a spring retainer element 78. The circular seat members 62 and 72 define registering central openings 80 and 82 respectively which are in turn registered with ports 84 and 86 defined in the side plates of the valve body. These ports cooperate to define a flow passage through which fluid may flow through the valve and through which the hot tap cutter is extended for hole cutting operations in the pipeline 12.

The valve body defines an internal valve chamber 88 within which is movably disposed a gate member 90. The gate member defines opposed planar sealing surfaces 92 and 94 for sealing engagement with the respective seat rings 62 and 72. At one end of the gate member 90 is provided a drive connection 96 which is internally threaded and which receives the threads of a valve stem 98. The valve stem is rotatably connected within the valve chamber 88 by means of a bearing 100 which is supported by a valve stem retainer element 102. As the valve stem 98 is rotated a force will be transmitted through the connection element 96 to the gate, thereby imparting linear movement to the gate member 90 within the valve chamber. A thrust member 104 is secured on the opposite side of the gate member 90 and is provided with a thrust roller bearing member 106 which is adapted to engage the inner surface 108 of the side plate 38 to thus stabilize the position of the gate member within the valve chamber during linear movement.

As mentioned above, the sealing members of hot tap valves frequently become damaged and excessively worn during use because of the presence of metal cuttings during hot tap pipeline cutting operations. The metal cuttings become deposited on or about the sealing members and seat rings as hot tap cutting operations are conducted. Thereafter, upon movement of the gate member to its closed position to accomplish valve sealing, these metal particles can be forced into contact with the sealing members by movement of the gate. Typically, the elastomeric sealing elements of hot tap valves become excessively worn during only a few cycles of valve operation and thus require replacement before the valve can be efficiently reused. In fact, hot tap valves are expected to withstand only a few cycles of operation during normal hot tap connection operations. Thereafter, hot tap valves are typically removed from the hot tap connections and are replaced by means of flanges, bypass lines or other such structures. The valve is then available for use. The primary deterrent to reuse of hot tap valves is the requirement for seal replacement. In the typical case, hot tap valves are disassembled to permit access to the seat assemblies. The seat assemblies or at least the elastomeric sealing elements thereof are then replaced. The valve is then reassembled and may then be again used for hot tap connection operations. The requirement for disassembly of the valve mechanism simply for face seal replacement is obviously a considerably expensive procedure because of the large number of bolts that are typically utilized for assembly of hot tap valve bodies. Especially under high pressure conditions where the bolts of sandwich type hot tap valves must be subjected to high torque for preliminary tensile loading, the removal and replacement of from twenty to forty bolts requires considerable labor and expense. It is desirable therefore to provide a valve mechanism wherein the face sealing elements thereof may be efficiently removed and replaced without necessitating disassembly of the valve mechanism. Accordingly, the present invention accomplishes this feature by providing for movement of the gate member 90 to a position wherein the free edge 110 of the gate member is disposed radially outwardly of the circular face sealing members 112 and 114 of the seat members 62 and 72 respectively.

It is desirable to prevent the elastomeric O-ring type sealing members from becoming displaced from their respective seal grooves upon opening or closing movement of the gate member. Under certain circumstances pressure differential between the upstream and downstream seats can cause extrusion of the seal members from certain portions of the seal grooves, causing the seal members to protrude to the extent that seal cutting or excessive abrasion occurs when the gate member is moved past the sealing members. In order to minimize seal extrusion the seat rings 62 and 72 are formed to defne a plurality of vent passages 116 and 118 respectively which communicate the seal grooves with the valve chamber 88, radially outwardly of the resilient seal elements.

Referring now to the fragmentary sectional view of FIG. 4, a portion of the upper seat ring 72 of FIGS. 2 and 3 is illustrated in enlarged detail. As shown the seat ring 72 is formed to define a circular seal groove 120 of generally triangular form for retention of the O-ring type elastomeric sealing member 114. The triangular cross-sectional form of the seal groove 120 is defined by radially inner and outer cam surfaces 122 and 124 which are disposed in angulated relation and which provide the seal groove 120 with an undercut configuration at the inner and outer radial portions thereof. The circular surfaces 122 and 124 are of frusto conical configuration and cooperate to define a restricted opening through which the seal member 114 projects. The inner surfaces of the seal groove 120 are defined by angulated intersecting surfaces 126 and 128 having a centralized line of intersection at 130. Surfaces 126 and 128 merge with cam surfaces 122 and 124 respectively by curved corner surfaces 132 and 134 respectively. Outwardly of the frusto-conical surfaces 122 and 124 are connected tapered wall surfaces 123 and 125 thereto, respectively. The vent passage 118 is in communication with the radially outer portion of the seal groove 120 by virtue of its intersection with the seal groove at or adjacent the curved corner surface 134.

As shown in FIG. 4, the seal member 18 is illustrated in full line as being slightly deformed upon being forced through the restricted opening of the seal groove. The broken lines in FIG. 4 illustrate the undeformed, circular cross-sectional configuration of the resilient seal. After the major cross-sectional dimension of the seal has cleared the restricted opening upon being inserted into the seal groove 120 the cam surfaces 122 and 124 will cause it to be urged into tight engagement with the inner surfaces 126 and 128 of the seal groove. The surfaces 122 and 124 will restrain any tendency of the seal member to shift outwardly of the seal groove 120 as a result of the outer portion of the seal member being conformed to mate against the tapered wall surfaces 123 and 125 to facilitate easy insertion of the seal member within the seal groove 120.

When a gate valve is being opened or closed under pressure the sealing member is subjected to extremely high velocity flow at the initial stages of opening movement or the final stages of closing movement. This high velocity flow passing across the seal member can cause extrusion of the seal member from the groove such that it protrudes to a position where the gate member will contact it and cause cutting or abrasive damage to the sealing member. When this occurs, the sealing member may lose its capability for maintaining a positive seal. It is desirable therefore to prevent extrusion of the seal member from its groove to thus minimize or eliminate any damage by cutting or excessive abrasion.

It should be noted that the end surface 110 of the gate member merges with the planar surfaces 92 and 94 by means of rounded surface portions 136 and 138. These rounded surfaces provide a seal camming activity as the end surface portion 110 of the gate member moves past the respective seal rings 112 and 114.

When the gate member 90 is positioned with the rounded surfaces in slight contacting relation with the seal rings 112 and 114 as shown in FIG. 5, the seal members will respond to high pressure conditions essentially in the manner shown in FIG. 5. Pressure will act upon the seal members as shown by the pressure force arrows thereby causing cross-sectional deformation of at least portions of the seal ring in the manner shown. With pressure relief occurring via the vent passages 116 and 118 high pressure conditions will force certain cross-sectional portions of the seal member 114 essentially to the configuration shown in FIG. 5. Surface 124 at the radially outer portion of the seal ring grooves will function in a camming manner to thus cause the seal member to have components of movement that occur radially outwardly and linearly inwardly. Thus the seal member 114 is urged by pressure toward the radially outward and bottom portions of the seal groove and has little tendency to become extruded between the gate and seat. Obviously, the upstream and downstream seals will be subjected to different pressure and force considerations. Under ordinary circumstances a force could be developed tending to extract or extrude the seal ring from its groove. This tendency is overcome by the presence of the vent passage 118 which causes the seal member to be forced more tightly into its groove in response to pressure induced force.

The inner peripheral portion of each of the seat rings defines a circular, raised sealing land 140 which extends from the seal groove to the inner periphery of the seat ring. The resilient seal ring establishes initial sealing engagement with the gate member 90. Under high pressure conditions sealing contact between the gate member and seat ring is also maintained by metal-to-metal contact between the sealing surfaces of the gate and the raised inner peripheral sealing lands 140.

The valve body is closed by means of a bonnet closure 142 which is bolted to the bonnet assembly flange of the valve body structure. To the bonnet closure 142 will be attached or assembled a suitable valve actuating mechanism such as a manual hand wheel operator as shown in FIG. 1, or a powered valve actuator such as those energized electrically, hydraulically or pneumatically.

SEAL CHANGING PROCEDURE

The seal changing procedure will be conducted with the valve mechanism at atmospheric pressure. The seals may be changed with the valve assembled to the flange 28 of a hot tap connection essentially as shown in FIG. 2 but with flange 36 of the hot tap cutter removed. The seal members may also be replaced after the valve assembly has been completely removed from the hot tap connection as is typical upon completion of a hot tap connection procedure.

To permit replacement of the elastomeric sealing members 112 and 114 the gate member 90 is first moved to the position shown in FIG. 2 where the end surface portion 110 thereof is disposed radially outwardly of the seal members. After this has been done, service personnel may reach through the ports 82 and 86 of the seat ring and body plate and insert a small, sharp pointed tool into the seal groove and possibly into the seal ring itself. By manipulating the seal removal tool the seal ring is manually extracted from its respective seal groove. After this has been done, the area of the seal groove may be cleaned such as by flushing it with cleaning fluid, high pressure air, etc. After cleaning, service personnel will simply insert a new O-ring type sealing element into each of the seal grooves. The seal replacement operation is then complete, after which the valve mechanism may be again used for hot tap connection procedures or for any other suitable purpose.

In view of the foregoing, it is respectfully submitted that a valve mechanism has been provided herewith which clearly accomplishes all of the features and objects hereinabove set forth, together with other features which are inherent in the valve mechanism itself. It will be understood that certain combinations and subcombinations of this invention are of utility and may be employed without reference to other features and subcombinations. This is contemplated by and is within the scope of the present invention.

What is claimed is:

1. A gate valve mechanism permitting seal replacement while in the assembled condition thereof, comprising:

(a) a generally rectangular valve body structure formed by flat spaced side plates and flat end plates joined by welds, said valve body structure defining a valve chamber and flow passage means intersecting said valve chamber, one of said side plates forming a circular seat recess about said flow passage means, a seat retainer extending from the opposite one of said spaced side plates and forming a circular seat recess about said flow passage means;

(b) a pair of opposed seat rings being seated within said seat recesses, said seat rings each defining circular face seal groove means and passage means communicating the bottom, radially outer portion of said seal groove means with said valve chamber said face seal groove means being defined by opposed diverging frusto-conical side wall surfaces forming a restricted circular groove opening, the bottom portion of said seal groove means being formed by a pair of converging frusto-conical bottom wall surfaces intersecting respective ones of said diverging frusto-conical surfaces;

(c) resilient O-ring face seal ring means being removably retained within each of said seal groove means, said outer portion of said seal groove means being formed by tapered wall surfaces interfaces to permit easy insertion and removal of the seal ring means within said seal groove means, said resilient O-ring face seal ring means being of significantly greater cross-sectional diameter than the width of said restricted circular groove opening and being of sufficient cross-sectional dimension to simultaneously establish contact with at least one of said tapered surfaces and said diverging and converging frusto-conical surfaces to restrain any tendency of said seal mans from shifting outwardly of said seal groove means in all positions of the gate valve mechanism;

(d) nonported gate means being movably positioned with said valve chamber and defining opposed flat sealing surfaces for sealing engagement with said seat rings, said gate means being movable between open and closed positions to control the flow of fluid through said flow passage means and being positionable radially outwardly of said resilient seal means to thus expose said resilient O-ring face seal means for removal; and (e) means for controlling movement of said gate means within said valve chamber between said open and closed positions.

2. A gate valve mechanism as recited in claim 1, wherein:

said gate means defines edge surface means being disposed in substantially normal relation with said sealing surfaces and having curved surface portions intersecting said edge surface means and said sealing surface means.

3. A gate valve mechanism as recited in claim 1, wherein:

(a) said seat rings are of integral construction and define outer peripheral seal groove means of greater diameter than the diameter of said face seal ring means;

(b) outer peripheral seal means are retained within said outer peripheral seal groove means and seal said seat rings with respect to said valve body; and (c) said face seal means and said outer peripheral seal means establish differential pressure areas of sealing with respect to said gate means and said valve body, causing said seat rings to be pressure energized toward said gate means.

4. A gate valve mechanism as recited in claim 1, wherein:

said seat rings are of integral construction and each define an annular land projecting toward said gate means and extending from the inner periphery of said face seal groove means to the inner periphery of said seat ring, said annular land forming a circular metal sealing surface of planar configuration.

5. A gate valve mechanism as recited in claim 1, wherein:

said seat ring means are of integral metal construction and define an inner peripheral circular land projecting toward said gate means, said land defining an annular metal surface of flat configuration for engagement with said sealing surface of said gate.

6. A gate valve mechanism as recited in claim 1, wherein:

said passage means intersects said face seal groove means adjacent the juncture of said outer peripheral frustoconical side wall surface and the radially outermost one of said bottom wall surface.

* * * * *